June 5, 1956  J. G. HODGENS, JR  2,748,790
ELECTRONICALLY CONTROLLED FLOW DIVERTING APPARATUS FOR
MAINTAINING A PREDETERMINED SOLUTION CONCENTRATION
Original Filed March 18, 1952  2 Sheets-Sheet 1

INVENTOR
JOHN G. HODGENS, JR.
BY Williamson, Williamson, Schroeder & Adams
ATTORNEYS June 5, 1956  J. G. HODGENS, JR  2,748,790
ELECTRONICALLY CONTROLLED FLOW DIVERTING APPARATUS FOR
MAINTAINING A PREDETERMINED SOLUTION CONCENTRATION
Original Filed March 18, 1952   2 Sheets-Sheet 2
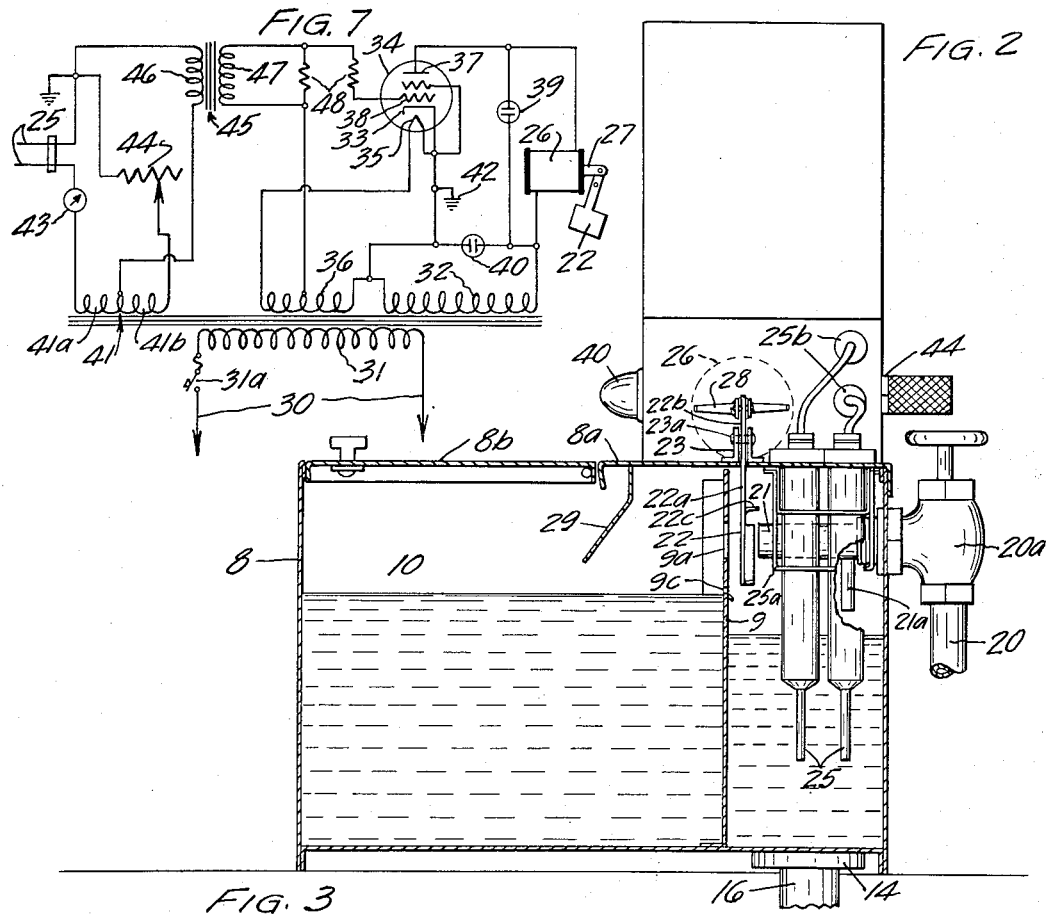
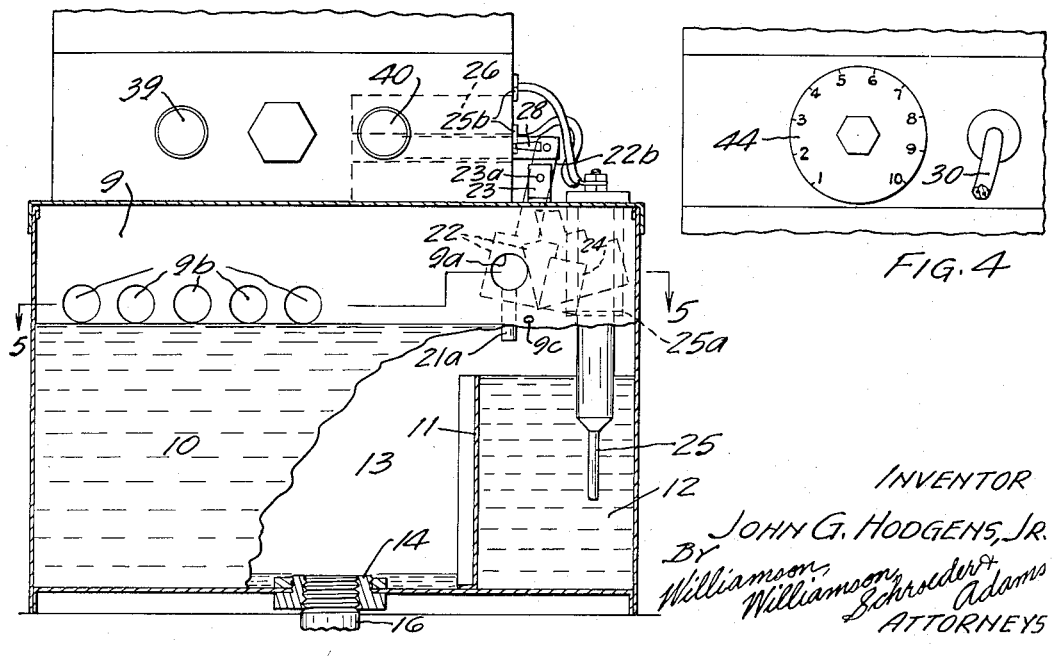
INVENTOR
JOHN G. HODGENS, JR.
BY Williamson, Williamson, Schroeder & Adams
ATTORNEYS United States Patent Office 2,748,790
Patented June 5, 1956

2,748,790

ELECTRONICALLY CONTROLLED FLOW DIVERTING APPARATUS FOR MAINTAINING A PREDETERMINED SOLUTION CONCENTRATION

John Graham Hodgens, Jr., Chippewa Falls, Wis., assignor to The Diversey Corporation, a corporation of Illinois Continuation of abandoned application Serial No. 277,318, March 18, 1952. This application January 21, 1955, Serial No. 483,212

13 Claims. (Cl. 137—93)

This invention relates generally to control mechanism designed primarily for maintaining a predetermined concentration in a controlled solution in a system.

The electronic circuit of my present invention is substantially similar to the electronic circuit disclosed in my prior application filed June 12, 1948, Serial No. 32,640, which matured into Patent No. 2,621,673 on December 16, 1952, which application was copending with my prior application 277,318 filed March 18, 1952, of which this application is a continuation. However, my present invention uses no solenoid valves in any of the liquid supply lines, but instead provides a shiftable baffle or deflector plate normally positioned to deflect a stream of liquid but, upon actuation of the control mechanism, is shifted out of deflecting position to permit the stream of liquid under pressure to be directed in another direction. This permits the use of a mechanism in which no close fitting parts are required and in which material deposited thereon from impurities contained in the water stream directed thereagainst will have little, if any, effect on the successful operation thereof. In the usual systems for maintaining a predetermined concentration of an electrically conductive solution, a solenoid valve is employed to control the flow of liquid which ultimately causes addition of liquid to the solution being controlled to vary the solution concentration. However, the collection of impurities contained in the water stream on the parts of the solenoid valve frequently render the same inoperative and thus maintenance at relatively frequent intervals is usually necessary with such solenoid valves.

It is an object therefore of my present invention to provide an electronically controlled system for maintaining an electrically conductive solution at a predetermined concentration without the use of any close fitting liquid sealing valves which are troublesome because impurities contained in the liquid stream often render the same partially or wholly inoperative.

It is another object to provide a novel and highly efficient electronically controlled mechanism incorporating a shiftable baffle or deflector plate requiring no close interfitting of parts to provide a liquid seal but merely shiftable from liquid deflecting position under the control of an electronic system to permit a normally deflected stream of liquid to be directed into a solution controlling tank to vary the concentration and volume of the liquid solution being used.

More specifically, it is an object to provide an electronically controlled mechanism responsive for actuation to variations in the concentration of an electrically conductive solution supplied through a conduit and directed toward a concentrate tank with a shiftably mounted deflector or baffle plate normally intercepting the stream of liquid solution discharged from said conduit to prevent the same from flowing into a concentrate tank, said conduit having a branch outlet delivering into a sampling tank in which a detector is positioned to provide a continuous sampling operation, said control mechanism shifting said deflector plate out of deflecting position whenever the concentration of the solution falls below a predetermined limit to permit the stream of liquid to be discharged directly into a concentrate tank to overflow the same and thereby add concentrated solution to the solution being controlled and increase the concentration thereof.

It is still a further object to provide a mechanism of the class described in which the solution in the sampling tank is constantly being agitated as well as providing a vigorous agitation of the solution in the concentrate tank during overflowing thereof.

These and other objects and advantages of my invention will more fully appear from the following description made in connection with the accompanying drawings wherein like reference characters refer to the same or similar parts throughout the several views and in which:

Fig. 2 is a longitudinal vertical sectional view taken substantially on the broken line 2—2 of Fig. 5 and showing my control mechanism per se;

Fig. 3 is a transverse vertical sectional view thereof, taken substantially along the line 3—3 of Fig. 5 and showing the extremities of movement of the deflector plate by two dotted line positions thereof;

Fig. 4 is a fragmentary rear elevational view showing the potentiometer indicator dial;

Fig. 7 is a wiring diagram of the electronic control circuit.

As illustrated in the accompanying drawings, I provide a compartmented box made from any suitable material such as stainless steel and designated as an entirety by the numeral 8. A transversely disposed partition 9 is sealingly fixed to the bottom and side walls of the box 8 across the rear portion thereof to define a concentrate tank 10 at the front of the box which is adapted to contain a concentrated solution such as a detergent solution for dish washers and other cleaning apparatus. The detergent powder is poured into the tank 10 and settles to the bottom thereof until the liquid therein is agitated.

Figure 1:
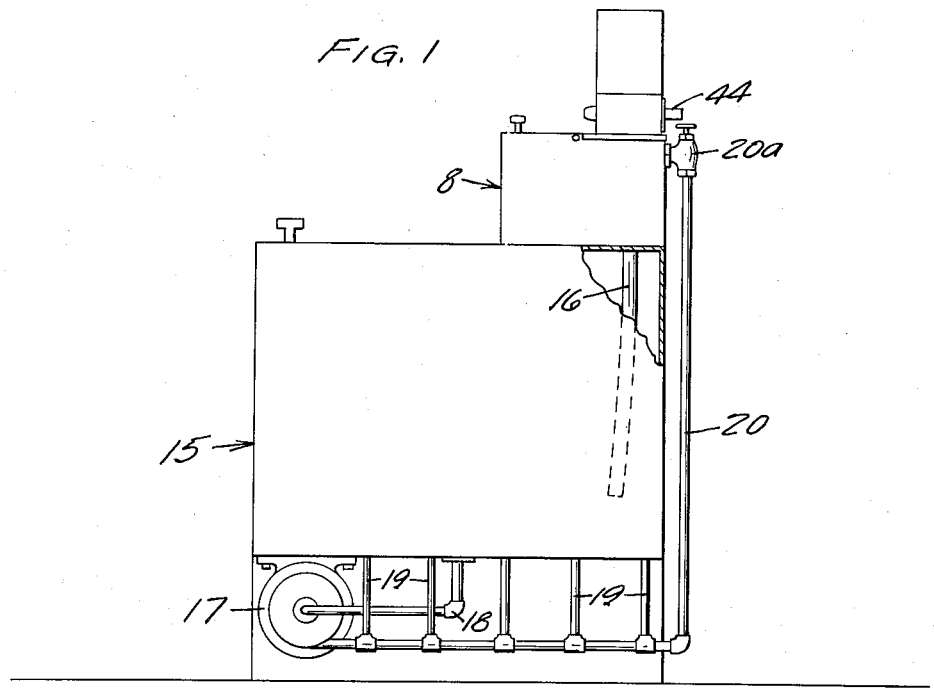
Fig. 1 is an end elevational view of a dish washing machine showing a typical installation of my present control mechanism.
Figure 5:
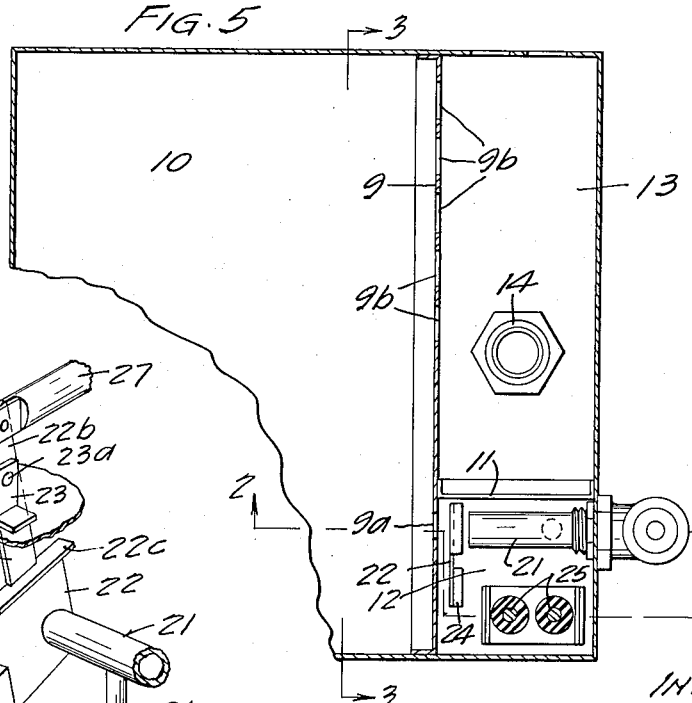
Fig. 5 is a horizontal sectional view taken substantially on the broken line 5—5 of Fig. 3 showing the arrangement of the liquid compartments of my control apparatus.

A relatively low longitudinally disposed partition 11 divides the rear compartment into a sampling compartment 12 and an overflow collection and outlet delivery compartment 13. The partition 11 is of course sealingly fixed to the bottom and rear panels of box 8 as well as to an intermediate portion of the transverse partition 9. The overflow compartment 13 has a drain outlet 14 in the bottom thereof and this drain outlet 14 by means of a discharge conduit 16 communicates with the reservoir of any conventional washing apparatus such as the dish washer shown in Fig. 1 and designated as an entirety by the numeral 15. The dish washer 15 has a motor driven pump 17 for spraying the washing solution upwardly within the washing chamber thereof and this pump 17 receives washing solution from the reservoir at the bottom of the dish washer tank through the conduit 18 and discharges the washing solution under pressure upwardly through a plurality of upstanding discharge conduits 19, best shown in Fig. 1. A sampling control line 20 is tapped into the main pressure supply line from the pump 17 and extends upwardly therefrom to the box 8 and is introduced into said box at a point above the sampling compartment 12. A shut-off valve 20a is provided in the supply line 20 and a discharge nozzle 21 extends partially across the length of the sampling compartment 12, as best shown in Figs. 2 and 5, and has a depending sampling discharge T pipe branching downwardly therefrom to discharge directly into the sampling compartment 12. The rear portion of the box 8 has a fixed cover section 8a secured thereto by any suitable means and a hinged cover section 8b closes the top of tank 10.

Figure 6:
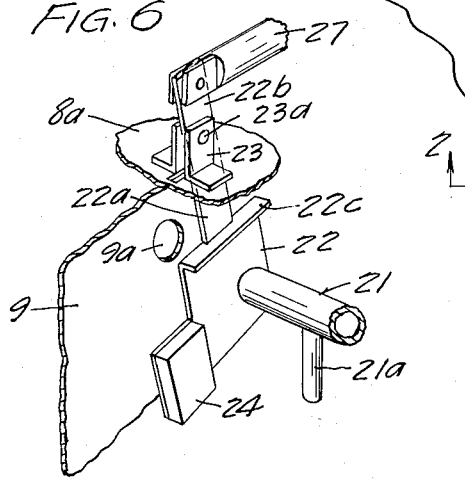
Fig. 6 is a perspective view of the solenoid controlled shiftable deflector plate.

A deflector plate 22 has a pivot arm 22a fixed thereto and said pivot arm is pivotally mounted on an intermediate pivot point on suitable fixed brackets 23 rigidly connected to the top surface of cover section 8a. The brackets 23 extend upwardly above the top surface of said cover section 8a and a pivot pin 23a extends therethrough and through an intermediate portion of the pivot arm 22a on which the deflector plate 22 is mounted. The upwardly extending portion of pivot arm 22a is designated by the numeral 22b and acts as an actuating lever for said deflector plate 22. The deflector plate 22 has a protective flange 22c fixed along the top edge thereof, as best shown in Figs. 2 and 6, and is normally held in deflecting position immediately in front of the discharge end of nozzle 21 by any suitable means such as the weight element 24 fixed along the rear edge thereof. This weight element 24 swings said deflector plate 22 with a pendulum action into normal deflecting position, as shown in Fig. 6, and by one dotted line position of Fig. 3. The other dotted line position of Fig. 3 shows the plate swung upwardly out of deflecting position as will be hereinafter described.

The sampling T 21a discharging downwardly into sampling compartment 12 constantly agitates the solution therein and this agitation is materially increased by the deflector plate 22 which discharges the stream of liquid directed thereagainst generally downwardly into both the sampling compartment 12 and the outlet delivery compartment 13. A pair of detector elements such as the electrodes 25 are submerged below the surface of the liquid in the sampling compartment and the agitated washing solution is constantly circulating therearound to produce thorough intermixing of the solution and keep the electrodes relatively clean and free from deposits thereon and thus insure an accurate reading therefrom at all times. This solution is constantly overflowing over the top of longitudinal partition 11 into the outlet delivery compartment 13.

When the concentration of the washing solution in the sampling compartment 12 falls below a predetermined limit as set on the electronic control system, said electronic control energizes a solenoid 26, the shiftable plunger 27 of which is pivotally connected to the upper portion of the deflector plate actuating lever 22b, and said deflector plate 22 is forcibly retracted to swing out of deflecting position and permit the flow of solution from the discharge nozzle 21 to pass freely thereby. A laterally extending leaf spring 28 is provided to cushion the inwardly directed projection of the plunger 27 when the deflector plate 22 has been shifted into retracted position.

An aperture 9a is provided in the transverse partition 9 within box 8 in precisely opposed relation to the discharge end of nozzle 21 and when the deflector plate 22 has been shifted out of deflecting position the stream of washing solution discharging from the nozzle 21 is directed into the concentrate supply tank 10 through said aperture 9a. As best shown in Fig. 2, an inner agitating deflector baffle 29 is rigidly mounted in the upper portion of tank 10 as by being fixed in angularly depending relation to the lower surface of the top panel 8a and is positioned to receive the discharge stream from nozzle 21 to deflect the same downwardly from above the surface of concentrate solution to agitate the same and overflow the tank 10 through a plurality of relatively large overflow apertures 9b which are provided in the transverse partition 9 at the desired liquid level within the concentrate tank 10 and are disposed above the outlet delivery compartment 13 as best shown in Fig. 5.

As best shown in Figs. 2 and 3, a bleed hole 9c is formed through the transverse partition 9 at the liquid level within tank 10 governed by the overflow apertures 9b and affords direct communication between the concentrate supply tank and the sampling compartment 12 to increase the concentration in the sampling tank at a faster rate than the same would be increased from the depending sampling supply T 21a. This of course eliminates lag between the concentration reached in the wash solution within the dish washer 15 or other similar washing apparatus and the solution pumped up through conduit 20 and delivered to the sampling tank 12 through the depending branch outlet 21a. It should be noted that the two electrodes are removably mounted through suitable apertures in the fixed cover section 8a and a suitable stabilizing bracket structure 25a, best shown in Figs. 2 and 3, securely holds said electrodes against lateral shifting movement. The upper portions of the electrodes 23 are of course insulated and the connectors mounted in the top thereof have plug-in connections in the electronic circuit, as best shown at 25b of Figs. 2 and 3, to facilitate removal of the electrodes whenever necessary.

As has been previously stated herein, the electronic control for actuating the solenoid 26 is responsive to the electrical conductivity of the solution between the electrodes 25 in the sampling tank 12 and is substantially similar to the electronic control disclosed and claimed in my previously identified Patent 2,621,673 and incorporates the resistance and inductance bridge circuit for controlling the conductivity of the thyratron tube shown therein, the main difference between the two circuit assemblies being that the plate circuit of the instant thyratron tube circuit is connected directly with the coil of the deflector plate actuating solenoid 26 while in the structure of my prior application disclosed a relay switch controlled by the plate circuit of the thyratron and controlling the actuation of a solenoid valve in the supply line to the concentrate tank. This is possible since the solenoid used in my present structure requires far less current than is required in solenoid actuated liquid control valves.

The present circuit includes any suitable source of alternating electric current such as the lines 30 shown in Fig. 6 which supply current to the primary winding 31 through a switch 31a. A pair of secondary windings 32 and 36 are connected in series. The winding 32 produces a charge on the cathode 33 of the thyratron tube 34 which, in the form shown, is a No. 502A tube. The filament 35 of the tube is heated by current from winding 36 and the filament circuit is grounded as at 42. A control grid 38 is provided which of course controls the conductivity of the tube. The plate 37 of the tube is connected directly with the coil of solenoid 26 and the other end of the coil is connected to the cathode 33 through winding 32. A fixed bias is imposed upon control grid 38 as by tapping into the secondary winding 36 and this bias is of course sufficient to normally prevent conductivity of the tube 34. An indicator light such as the neon feed pilot light 39 is connected across the solenoid circuit to indicate energization thereof. A second indicator light such as the neon pilot light 40 is connected across plate circuit winding 32 to indicate whenever the primary 31 is energized.

A resistance and induction bridge circuit is provided for varying the bias of the control grid 38 and has a secondary winding 41 for energizing the same. One side of the secondary winding is connected to one of the electrodes 25 and has a current meter such as the milliammeter 43 connected therein. The secondary winding 41 is divided into two sections 41a and 41b. A bridge transformer 45 has a primary winding 46 which is connected in series with the section 41a and the electrodes 25 to form one current path through the winding 45. A second current path is formed through the winding 45 in opposition to said first current path by the winding 41b through the potentiometer 44. Whenever the potentiometer controlled current through the second current path exceeds the current through the first current path, a voltage will be induced in the secondary winding 47 of the bridge transformer 45. This induced voltage on secondary winding 47 is 180 deg. out of phase with the bias voltage imposed by the secondary winding 36 on the control grid 38.

The potentiometer 44 is adjusted so that whenever the resistance between the two electrodes 25 increases above a predetermined amount, the bridge will become unbalanced sufficiently to impress an offsetting bias voltage sufficient to render the tube 34 conductive and whenever the resistance between the electrodes 25 is sufficiently reduced by increasing the concentration of the solution the controlling bias of the grid 38 will again be restored sufficiently to render the tube 34 non-conductive. It should be noted that this electronic control system positively controls not only the minimum concentration of a solution, but also the maximum concentration and de-energizes the solenoid 26 whenever the predetermined required concentration is reached to positively prevent over concentration of the solution and wasting of detergent.

In the actual control system which I use in my present invention, the bias imposed upon grid 34 by winding 36 is excessive to cause considerable overbalancing of the control charge on the grid. Also, since a slightly unbalanced bridge is considerably more sensitive than a perfectly balanced bridge, I produce a slight unbalance of my bridge under normal concentrations within the prescribed limits and until the unbalance of the bridge becomes sufficient to overcome the bias imposed on the grid 38 by the winding 36, the tube 34 will remain non-conductive. The current indicating milliammeter 43 can of course be calibrated to directly indicate the concentration of the washing solution so that the operator may know at any particular time how effective his solution is.

It will be seen that I have provided a novel and highly efficient electronically controlled mechanism for maintaining the concentration of an electrically conductive solution within certain prescribed critical limits. With my improved apparatus disclosed herein, the use of close fitting liquid sealing valves has been entirely eliminated and thus the problem of impurities carried by the liquid becoming deposited upon the sealing elements of said valve and rendering the same inoperative has been substantially solved. By providing a swingably mounted deflector plate normally positioned to receive a stream of liquid to deflect the same, but upon energization of a solenoid the plunger of which is positively pivotally connected to a deflector plate actuating arm removes all moving parts from contact with the solution normally impinging upon said plate and maintains efficient operation of the mechanism without the detrimental effects of deposits of impurities carried by the liquid stream. When the solenoid is actuated to positively swing the arm 22a about pivot pin 23a and remove plate 22 from deflecting position, the stream of solution discharged from nozzle 21 passes through the aperture 9a and into the concentrate tank 10 above the liquid level therein and is deflected downwardly into the concentrated solution from above by the deflector plate 29 to agitate the contents of tank 10 and cause overflowing of the concentrated solution through the overflow aperture 9b and the control aperture 9c. The depending sampling branch T 21a produces constant agitation and overflow of the liquid within the sampling compartment 12 to maintain efficient intermixing of the solution in said sampling tank during both the normal deflecting position and retracted re-generating position of the plate 22. The deflector plate 22 is swung upwardly into deflecting position by the eccentrically disposed weight 24 and is positively retracted when the solenoid 26 is energized to be swung upwardly in the opposite direction out of deflecting position. The elimination of solenoid valves from systems for controlling solution concentrations eliminates the most troublesome single element formerly used in such mechanisms or systems. By using the free-swinging pendulum action for actuating plate 22, a minimum of thrust is required by solenoid 26 and therefore connection of the coil thereof directly in the plate circuit of the thyratron tube 34 greatly simplifies the control mechanism of my present invention and materially reduces the cost of manufacture thereof since the relay switch previously used is entirely eliminated therefrom.

It will, of course, be understood that various changes may be made in the form, details, arrangement and proportions of the parts without departing from the scope of my invention which, generally stated, consists in the matter shown and described herein and set forth in the appended claims.

This application is a continuation of my co-pending application Serial No. 277,318 now forfeited.

I claim:

1. Electrically controlled apparatus for maintaining a predetermined concentration in an electrically conductive solution, said apparatus comprising a concentrate tank adapted to contain a concentrated liquid solution, a liquid supply line directed to discharge a stream of liquid under pressure directly into said tank with the discharge end thereof spaced from said tank and disposed above the liquid level therein, a shiftable deflector element normally opposed to the discharge end of said supply line, yieldable means normally holding said deflector element in deflecting position to normally prevent the discharge therefrom from flowing into said tank, a control system including a detector responsive to the concentration of a liquid solution and adapted to be actuated only when the solution varies from a predetermined concentration, an electro-responsive actuating member electrically connected with said control system for actuation thereby and mechanically connected with said deflector element to shift the same out of deflecting position when actuated by the control system to permit the stream of liquid under pressure to be discharged directly into the tank to overflow the same, and means affording overflow communication between the tank and the solution being controlled.

2. Electrically controlled apparatus for maintaining a predetermined concentration in an electrically conductive solution, said apparatus comprising a concentrate tank adapted to contain a concentrated liquid solution, a liquid supply line having the outlet end thereof directed to discharge into said tank and a stream of liquid, the concentration of said stream to be controlled, a shiftable deflector element interposed between the discharge end of said line and said tank, yieldable means normally positioning said deflector element to receive the stream of liquid discharged from the outlet end of said line to deflect said stream and prevent the same from flowing into said tank, a sampling compartment adapted to contain liquid, a sampling branch outlet from the supply line and having the discharge thereof positioned to constantly deliver an unobstructed pressurized stream into said sampling compartment, a detector mounted in said sampling compartment, a control system electrically connected with said detector to be actuated thereby when the solution in the sampling compartment varies from a predetermined concentration, an actuating member electrically connected with said control system for actuation thereby and mechanically connected with said deflector element to shift the same out of deflecting position when actuated by the control system to permit the stream of solution discharged under pressure from the outlet end of said supply line to flow directly into said tank to agitate and overflow said concentrate tank, and means affording overflow communication between the tank and the solution being controlled.

3. Electrically controlled apparatus for maintaining a predetermined concentration in an electrically conductive solution, said apparatus comprising a concentrate tank, a liquid supply line having the outlet end thereof directed to discharge into said tank a stream of liquid solution, the concentration of which is to be controlled, a deflector plate pivotally mounted for swinging movement into and out of deflecting position between the discharge end of said line and said tank, yieldable means normally holding said deflector plate in deflecting position, a sampling compartment adapted to contain liquid and separated from said concentrate tank, a branch outlet affording constant unobstructed communication between said supply line and said sampling compartment to constantly deliver only a portion of the solution carried by said line to the sampling compartment, a detector mounted in said sampling compartment, a control system electrically connected with said detector to be actuated thereby when the solution in the sampling compartment falls below the predetermined concentration, and an electro-responsive actuating member electrically connected with said control system for actuation thereby and mechanically connected with said pivoted deflector plate to swing the same out of deflecting position when actuated by the control system and permit the stream of liquid from the supply line to be discharged under pressure directly into the concentrate tank to agitate and overflow the same, and means receiving the overflow from the concentrate tank and carrying the same to the solution being controlled.

4. Electrically controlled apparatus for maintaining a predetermined concentration in an electrically conductive solution, said apparatus comprising a rigid box-like structure partitioned to define a plurality of subdivisions therewithin, said subdivisions consisting in a concentrate tank, a sampling compartment and an overflow outlet compartment, a solution supply line directed to discharge into said tank a stream of liquid, the concentration of which is to be controlled, the discharge end of said line being disposed outside of said concentrate tank and above the liquid level therein, a closed cover section covering at least a portion of the top of the box, a depending deflector plate having an upwardly extending actuating portion pivotally mounted for swinging movement on an axis disposed above said cover section, yieldable means normally holding said deflector plate between the discharge end of said supply line and the concentrate tank to prevent the discharge of the stream of liquid from said supply line from being directed into said concentrate tank, a branch conduit affording communication between an intermediate portion of said supply line and said sampling compartment to constantly deliver only a portion of the solution carried by said line to the sampling compartment, a detector mounted in said compartment, an electric control system electrically connected with said detector to be actuated thereby when the solution in the sampling compartment falls below a predetermined concentration, an electro-responsive actuating member electrically connected with said control system for actuation thereby and mechanically connected with the plate actuating portion of said deflector plate above said box cover section to swing said plate out of deflecting position when actuated by the control system and permit the solution from the discharge end of said supply line to be directed under pressure into the liquid of said tank from above to agitate and overflow the concentrated liquid therein, means affording overflow communication between said concentrate tank and said overflow outlet compartment, and means affording liquid communication between said overflow compartment and the solution being controlled.

5. The structure set forth in claim 4 and said deflector plate being constructed to prevent splashing of the solution directed thereagainst into the pivotal mounting of the upwardly extending actuating portion thereof.

6. The structure set forth in claim 5 and an anti-splash protective flange fixed across the upper portion of said deflector plate and extending rearwardly therefrom to prevent upward deflection of the solution directed thereagainst.

7. Electrically controlled apparatus for maintaining a predetermined concentration in an electrically conductive solution, said apparatus comprising a concentrate solution tank, a solution reservoir removed from said tank, a solution supply line delivering solution from said reservoir having a discharge nozzle with its discharge end disposed in outwardly spaced relation to said tank and directed to discharge solution into said tank above the liquid level therein, a sampling compartment separated from said concentrate tank, a branch conduit affording communication between said supply line and said sampling compartment to constantly deliver only a portion of the solution carried by said line to the sampling compartment, shiftable means normally preventing the stream of solution discharged from the line from flowing into the concentrate tank, and an electric control system responsive for actuation to a variation in the concentration of the solution supplied to said sampling compartment and adapted to shift said shiftable means to permit discharge of the solution under pressure from said nozzle directly into said concentrate tank to agitate and overflow the concentrate therein, and means for delivering the overflowed concentrate to the solution reservoir to increase the concentration of the solution therein.

8. Electrically controlled apparatus for maintaining a predetermined concentration in an electrically conductive solution, said apparatus comprising a tank, a sampling compartment adjacent said tank and communicating therewith, said tank adapted to contain a liquid solution, a liquid supply line having the outlet end thereof disposed in spaced relation to the tank above the liquid level therein and directed to discharge a stream of liquid under pressure into said tank, a shiftable deflector element normally opposed to the outlet end of said supply line, yieldable means normally holding said deflector element in deflecting position to receive and generally downwardly deflect into said sampling compartment the stream of liquid discharged from said supply line and prevent the same from following its discharge path into said tank, a control system including a detector responsive to the concentration of said liquid solution in said sampling compartment and adapted to be actuated only when the solution in said compartment varies from a predetermined concentration, and an electro-responsive actuating member electrically connected with said control system for actuation thereby and mechanically connected with said deflector element to shift the same out of deflecting position when actuated by the control system to permit the stream of liquid from the supply line to discharge under pressure directly into the liquid containing tank to cause agitation and overflow of the liquid therein into said sampling compartment.

9. Apparatus for maintaining a predetermined concentration in a controlled solution in a system, a concentration tank containing a concentrated solution which is to be added to the solution of the system in order to increase the concentration thereof, a sampling compartment adjacent said tank and communicating therewith by means of a passage, a liquid supply line having the outlet end thereof disposed above the liquid level of said concentration tank and directed to discharge a stream of liquid under pressure into said concentration tank, a shiftable deflector element normally disposed in spaced opposed relation to the discharge end of said supply line and positioned to receive and divert, in a generally downward direction into said sampling compartment, the stream of liquid discharged therefrom and prevent the stream from following its normal path into said concentration tank, yieldable means normally positioning said deflector element in deflecting position, and controllable means positively connected with said deflector element to remove the same from deflecting position and permit the stream of liquid discharged from said line to follow its normal discharge path and flow under pressure into said concentration tank and to cause said tank to add a concentrated solution, through said communicating passage to said adjacent sampling compartment.

10. Apparatus for maintaining a predetermined concentration in a controlled solution in a system, a concentration tank containing a concentrated solution which is to be added to the solution of the system in order to increase the concentration thereof, a sampling compartment adjacent said tank and communicating therewith by means of a passage, an outlet delivery compartment adjacent said tank and communicating therewith by means of a second communicating passage, a liquid supply line having the outlet end thereof disposed above the liquid level of said concentration tank and directed to discharge a stream of liquid under pressure into said concentration tank, a shiftable deflector element normally disposed in spaced opposed relation to the discharge end of said supply line and positioned to receive and divert, in a generally downward direction into said sampling compartment, the stream of liquid discharged therefrom and prevent the stream from following its normal path into said concentration tank, yieldable means normally positioning said deflector element in deflecting position, and controllable means positively connected with said deflector element to remove the same from deflecting position and permit the stream of liquid discharged from said line to follow its normal discharge path and flow under pressure into said concentration tank and to cause said tank to add a concentrated solution, through said communicating passages to said adjacent sampling compartment and said outlet delivery compartment.

11. Apparatus for maintaining a predetermined concentration in a controlled solution in a system, a concentration tank containing a concentrated solution which is to be added to the solution of the system in order to increase the concentration thereof, a sampling compartment adjacent said tank, a liquid supply line having the outlet end thereof disposed above the liquid level of said concentration tank and directed to discharge a stream of liquid under pressure from said supply line into said concentration tank, a shiftable deflector element normally blocking the discharge end of said supply line and positioned to receive and divert, in a generally downward direction into said sampling compartment, the stream of liquid discharged from said supply line, means for normally positioning said deflector element in said blocking position, controllable means adapted to be actuated when the solution in the system varies from a predetermined concentration and connected with said deflector element which removes the same from blocking position and permits the stream of liquid discharged from said supply line to follow its normal discharge path and flow under pressure into said concentration tank and means for discharging said concentrated solution from said concentration tank into the solution of the system.

12. Apparatus for maintaining a predetermined concentration in a controlled solution in a system, a concentration tank containing a concentrated solution which is to be added to the solution of the system in order to increase the concentration thereof, a sampling compartment adjacent said tank, a liquid supply line having the outlet end thereof disposed above the liquid level of said concentration tank and directed to discharge a stream of liquid under pressure into said concentration tank, a shiftable deflector element normally disposed in spaced opposed relation to the discharge end of said supply line and positioned to receive and divert, in a generally downward direction into said sampling compartment, the stream of liquid discharged therefrom and prevent the stream from following its normal path into said concentration tank, means for normally positioning said deflector element in deflecting position, controllable means adapted to be actuated when the solution in the system varies from a predetermined concentration and connected with said deflector element which removes the same from deflecting position and permits the stream of liquid discharged from said line to follow its normal discharge path and flow under pressure into said concentration tank and means for discharging said concentrated solution from said concentration tank into said sampling compartment.

13. Apparatus for maintaining a predetermined concentration in a controlled solution in a system, a concentration tank containing a concentrated solution which is to be added to the solution of the system in order to increase the concentration thereof, a sampling compartment adjacent said tank, a liquid supply line having the outlet end thereof disposed above the level of said concentration tank and directed to discharge a stream of liquid under pressure into said concentration tank, a shiftable deflector element normally disposed in spaced opposed relation to the discharge end of said supply line and positioned to receive and divert, in a generally downward direction into said sampling compartment, the stream of liquid discharged therefrom and prevent the stream from following its normal path into said concentration tank, means for normally positioning said deflector element in deflecting position, controllable means disposed within said sampling compartment and connected with said deflector element which removes the same from deflecting position and permits the stream of liquid discharged from said line to follow its normal discharge path and flow under pressure into said concentration tank, and means for discharging said concentrated solution from said concentration tank into the solution of the system.

References Cited in the file of this patent

UNITED STATES PATENTS

| Number | Name | Date |
|---|---|---|
| 832,097 | Thomas | Oct. 2, 1906 |
| 1,383,687 | Wood | July 5, 1921 |
| 1,576,001 | Olden | Mar. 9, 1926 |
| 2,539,976 | Samson et al. | Jan. 30, 1951 |
| 2,576,253 | Ferrell et al. | Nov. 27, 1951 |
| 2,593,825 | Albrecht | Apr. 22, 1952 |